US008156473B2

(12) United States Patent
Heidasch

(10) Patent No.: US 8,156,473 B2
(45) Date of Patent: Apr. 10, 2012

(54) MODEL ORIENTED DEBUGGING

(75) Inventor: Robert Heidasch, Speyer (DE)

(73) Assignee: SAP AG, Walldorf (DE)

( * ) Notice: Subject to any disclaimer, the term of this patent is extended or adjusted under 35 U.S.C. 154(b) by 1345 days.

(21) Appl. No.: 11/809,448

(22) Filed: Jun. 1, 2007

(65) Prior Publication Data
US 2008/0301648 A1    Dec. 4, 2008

(51) Int. Cl.
*G06F 9/44* (2006.01)
(52) U.S. Cl. .......................................... 717/124; 717/129
(58) Field of Classification Search .................. 717/104, 717/124–126, 129
See application file for complete search history.

(56) References Cited

U.S. PATENT DOCUMENTS

| 6,412,106 | B1* | 6/2002 | Leask et al. ................... | 717/124 |
| 2004/0168155 | A1* | 8/2004 | O'Farrell et al. .............. | 717/129 |
| 2006/0015852 | A1* | 1/2006 | Parkinson et al. ............. | 717/126 |
| 2006/0064677 | A1* | 3/2006 | Bickson et al. ................ | 717/124 |
| 2006/0206869 | A1* | 9/2006 | Lewis et al. ................... | 717/124 |
| 2008/0141222 | A1* | 6/2008 | Alpern .......................... | 717/125 |

* cited by examiner

*Primary Examiner* — Anna Deng
(74) *Attorney, Agent, or Firm* — Mintz Levin Cohn Ferris Glovsky and Popeo, P.C.

(57) ABSTRACT

A system and method for debugging a business application that has been generated according to a model are disclosed. A system includes a debugger that generates a model-oriented debugging view based on a model-oriented development environment that generates the business application. The model-oriented debugging view uses debugging information determined from a Java virtual machine that executes the business application to generate one or more breakpoints in the model-oriented debugging view.

13 Claims, 2 Drawing Sheets

MODEL ORIENTED DEBUGGING

BACKGROUND

This disclosure relates generally to business applications, and more particularly to systems and methods for debugging model-oriented business applications.

Many modern business applications, such as Enterprise Service Oriented Applications (ESOA) provided by SAP AG of Walldorf, Germany, or SAP's Notification and Eventing Engine, use abstract modeling as a development language to define "real" business processes or even business applications. This kind of abstraction is a very flexible and effective adaptation of business processes, and provides a business expert (e.g. business analyst) a code-free development platform to construct business processes and/or business application programs. In practice, the business expert builds a model of an application, which is then translated by the modeling infrastructure to application or machine code of a particular programming language (e.g. Java, C#, C++, etc.).

As an example and as depicted in FIG. 1, a model-oriented development environment includes a modeling tool 102 such as the SAP modeling infrastructure (MOIN) that generates Java code based on models and meta-models that are stored in a meta-object facility (MOF). A business expert uses a graphical editor of the modeling tool 102, such as SAP's NWDS Graphic Framework-based tools, to define the models and meta-models and store them in SAP modeling infrastructure. Subsequently, a MOIN Java generator 104 generates appropriate Java classes 106 from the models or meta-models. The Java classes can then be loaded as machine code 108 and eventually executed by a Java Virtual Machine (JVM) 110.

Problems or "bugs" in the program can occasionally arise, which are typically discovered and addressed by a debugger 112. However, current debuggers are limited only to debugging of the application code binary or source classes, as illustrated in FIG. 1, and not the models and/or meta-models on which the application is based. A way to debug running applications using the models and/or meta-models is needed.

SUMMARY

In general, this document discusses a system and method for debugging a running business application using models and/or meta-models.

According to one aspect, a computer-implemented method of debugging an executing business application that has been generated according to a model includes the steps of detecting a problem in the executing business application to generate debugging data, and generating a model-oriented debugging view of the executing business application based on the model. The method further includes the step of associating the debugging data to the model-oriented debugging view to generate at least one model-oriented debugging breakpoint for the executing business application.

In another aspect, a computer-implemented method includes the steps of generating a model of a business application, generating Java classes based on the Model of the business application, and executing, using a Java virtual machine, machine code based on the Java classes. A method further includes detecting a problem in the executing machine code to generate debugging data, and generating a model-oriented debugging view of the executing business application based on the model of the business application. A method further includes associating the debugging data with the model-oriented debugging view to generate at least one model-oriented debugging breakpoint in the model-oriented debugging view for the business application.

In yet another aspect, a system for debugging a business application that has been generated according to a model includes a debugger that generates a model-oriented debugging view based on a model-oriented development environment that generates the business application. The model-oriented debugging view uses debugging information determined from a Java virtual machine that executes the business application to generate one or more breakpoints in the model-oriented debugging view.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

The model-oriented debugger systems and methods described herein allow for debugging of programs that are developed or generated using a model-oriented development environment (also known as a modeling solution), in which a business expert or developer can also model debugging functionality. Accordingly, these systems and methods allow for the building of model-oriented debugging functionality that allows the business expert or developer to build a debugging model, which simplifies solving problems that occur in the model-oriented development environment.

Figure 1:
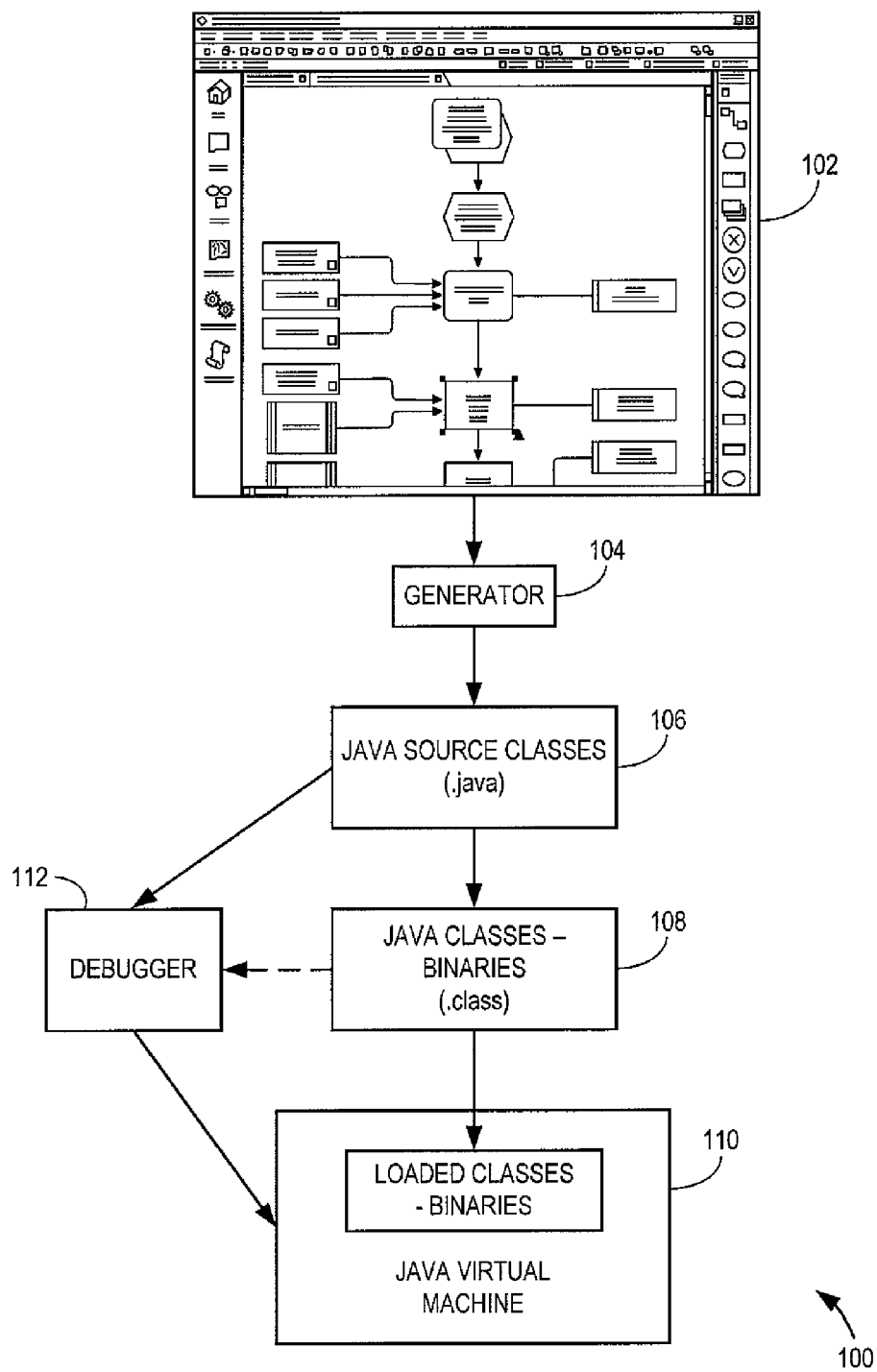
FIG. 1 is a functional block diagram of a model-oriented development environment with conventional debugger.
Figure 2:
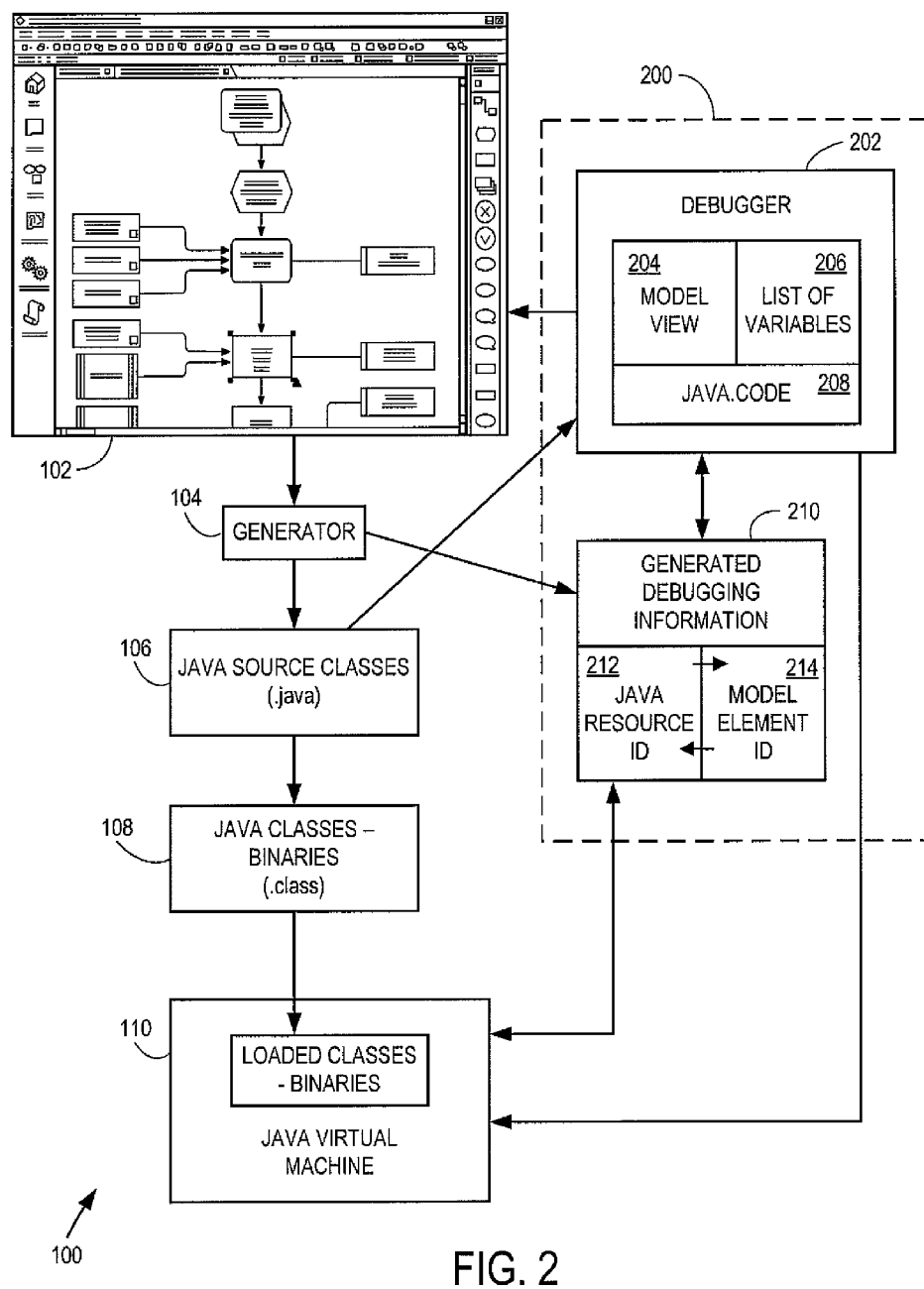
FIG. 2 is a functional block diagram of the model-oriented development environment with model-oriented debugger system.

FIG. 2 is a functional block diagram of the model-oriented environment 100, substantially as described in FIG. 1, but including a model-oriented debugger system 200. The model-oriented development environment 100 includes a modeling tool 102 that defines the models and meta-models and stores them a modeling infrastructure. A code generator 104 generates appropriate Java classes 106 and machine code 108 from the models or meta-models. The Java classes 106 can then be loaded as machine code 108 and executed by a Java Virtual Machine (JVM) 110.

To simplify the problem detection and analysis, the model-oriented debugger system 200 includes a model-oriented debugger 202 that is designed using the same model-oriented debugging view 204 (i.e. model-oriented view) that had been used to design the associated business process model or application model by the modeling tool 102. Thus, the model-oriented debugger 202 is configured to generate a breakpoint that can be set in the model-oriented debugging view 204 (model oriented view that is used to model debugging) that will stop the program execution at that location of the executing application.

The model-oriented debugger 202 also translates debugging data provided by the runtime environment (e.g. Java virtual machine 110) into the model-oriented debugging view 204. To achieve this, the model-oriented debugging system 200 requires generation of additional model-related information that allows the two way navigation from model to Java code navigation, and vice versa. The code generator 104 that is used in the modeling environment to generate Java classes 106 also generates the additional debugging information 210 and places it together with the generated Java classes 106.

The model and/or model element identification is provided by a model element identifier 214, and is generated using the following data: a model identifier (model ID)—an identifier that identifies a particular model; and a model element identifier (model element ID 214)—an identifier that identifies a particular element in the particular model.

A Java resource identification (provided by a Java resource ID 212) is generated using the following data: a Java resource name—the full qualifier Java class name (package name plus class name); and a Java resource line number—the Java number of the Java class that defines a particular statement.

The generated debugging information 210 enables the model-oriented debugger system 200 to make the following conversions: 1) from model element identifier 214 into Java resource identifier 212, which can be used, for example, to set the breakpoint in the model-oriented debugging view 204 and translate it into executable Java code 208; and 2) from Java resource identifier 212 into model element identifier 214, which can be used, for example, to transform Java Virtual Machine 110 runtime data into the model-oriented debugging view 204. The runtime data can include a list of variables 206 of the loaded machine code.

Accordingly, a model oriented debugger system and method gathers standard Java debugger data, determines Java code data such as resource name, Java code line, etc. based on the standard Java debugger data, and converts the Java code data to the model-oriented information. The model-oriented information is used by the model-oriented debugging view to generate breakpoints in the executing application where problems occur.

Embodiments of the invention and all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed:

1. A computer-implemented method of debugging an executing business application that has been generated according to a model, the method comprising:
   detecting a problem in the executing business application;
   generating debugging data associated with the problem;
   generating a model-oriented debugging view of the executing business application based on the model;
   translating the debugging data into the model-oriented debugging view;
   identifying a model element of the model associated with the problem based on the debugging data in the model-oriented debugging view by using a model identifier of the model and a model element identifier of the model element of the model;
   converting the model identifier and the model element identifier into a machine code resource identifier to generate a breakpoint in the model-oriented debugging view;
   translating the breakpoint in the model-oriented debugging view into executable machine code according to the machine code resource identifier; and
   executing the executable machine code associated with the breakpoint to debug the executing business application at the breakpoint.

2. A method in accordance with claim 1, wherein the breakpoint includes a Java class identifier.

3. A method in accordance with claim 2, further comprising associating the Java class identifier with the model element identifier that identifies the model.

4. A method in accordance with claim 2, wherein the breakpoint further includes a Java resource line number that defines a particular statement of a Java class of the executing business application.

5. A method in accordance with claim 4, further comprising associating the Java class identifier and the Java resource line number with a model identifier that identifies the model and a model element identifier that identifies a particular element of the model.

6. A method in accordance with claim 1, further comprising converting the model-oriented debugging view into Java resource identification information.

7. A method in accordance with claim 6, further comprising debugging one or more Java classes associated with the Java resource identification information.

8. A method in accordance with claim 1, wherein the machine code resource identifier includes a Java resource name and a Java resource line number.

9. A computer-implemented method comprising:
   generating a model of a business application;
   generating Java classes based on the model of the business application;
   executing, using a Java virtual machine, machine code based on the Java classes;
   detecting a problem in the executing machine code;
   generating debugging data associated with the problem;
   generating a model-oriented debugging view of the business application based on the model of the business application;
   translating the debugging data into the model-oriented debugging view;
   identifying a model element of the model associated with the problem based on the debugging data in the model-oriented debugging view by using a model identifier of the model and a model element identifier of the model element of the model;
   converting the model identifier and the model element identifier into a machine code resource identifier to generate a breakpoint in the model-oriented debugging view;
   translating the breakpoint in the model-oriented debugging view into the machine code according to the machine code resource identifier; and
   executing the machine code associated with the breakpoint to debug the business application at the breakpoint.

10. A computer-implemented method in accordance with claim 9, further comprising converting the breakpoint in the model-oriented debugging view into a breakpoint in the machine code.

11. A computer-implemented method in accordance with claim 9, wherein converting the model identifier and the model element identifier into the machine code resource identifier further includes:
   determining a Java resource name based on the model identifier.

12. A computer-implemented method in accordance with claim 11, wherein converting the model identifier and the model element identifier into the machine code resource identifier further includes:
   determining a Java resource line number based on the model element identifier and Java resource name.

13. A system for debugging a business application that has been generated according to a model, the system comprising:
   one or more processors;
   a debugger, executed by the one or more processors, performs:
      detecting a problem in executing the business application;
      generating debugging data associated with the problem;
      generating a model-oriented debugging view of the business application based on the model;

translating the debugging data into the model-oriented debugging view;

identifying a model element of the model associated with the problem based on the debugging data in the model-oriented debugging view by using a model identifier of the model and a model element identifier of the model element of the model;

converting the model identifier and the model element identifier into a machine code resource identifier to generate a breakpoint in the model-oriented debugging view;

translating the breakpoint in the model-oriented debugging view into machine code according to the machine code resource identifier; and executing the machine code associated with the breakpoint to debug the business application at the breakpoint.

* * * * *